US008661161B2

United States Patent
Zhang (10) Patent No.: US 8,661,161 B2
(45) Date of Patent: Feb. 25, 2014

(54) METHOD AND SYSTEM FOR PROVIDING MESSAGE INCLUDING UNIVERSAL RESOURCE LOCATOR

(71) Applicant: Tencent Technology (Shenzhen) Company Limited, Shenzhen (CN)

(72) Inventor: Li Zhang, Shenzhen (CN)

(73) Assignee: Tencent Technology (Shenzhen) Company Limited, Shenzhen City (CN)

( * ) Notice: Subject to any disclaimer, the term of this patent is extended or adjusted under 35 U.S.C. 154(b) by 0 days.

(21) Appl. No.: 13/631,300

(22) Filed: Sep. 28, 2012

(65) Prior Publication Data
US 2013/0024535 A1 Jan. 24, 2013

Related U.S. Application Data (63) Continuation of application No. PCT/CN2011/079629, filed on Sep. 14, 2011.

(30) Foreign Application Priority Data

Sep. 16, 2010 (CN) .......................... 2010 1 0287224

(51) Int. Cl.
G06F 15/16 (2006.01)
(52) U.S. Cl.
USPC .......................................... 709/246; 709/206
(58) Field of Classification Search
USPC ................................................ 709/206, 246
See application file for complete search history.

(56) References Cited

U.S. PATENT DOCUMENTS

| 7,330,863 | B2 | 2/2008 | Carro |
| 2006/0059212 | A1 | 3/2006 | Carro |
| 2007/0043879 | A1 * | 2/2007 | Vidya Sagar ................. 709/246 |
| 2007/0124414 | A1 * | 5/2007 | Bedingfield et al. .......... 709/217 |
| 2007/0136279 | A1 * | 6/2007 | Zhou et al. ........................ 707/6 |
| 2008/0034280 | A1 | 2/2008 | Carro |
| 2009/0006556 | A1 | 1/2009 | Agarwal et al. |

(Continued)

FOREIGN PATENT DOCUMENTS

| CN | 1711539 A | 12/2005 |
| CN | 101202748 A | 6/2008 |
| CN | 101674374 A | 3/2010 |
| WO | 2004049199 A2 | 6/2004 |

OTHER PUBLICATIONS

International Search Report for International Patent Application No. PCT/CN2011/079629, dated Nov. 24, 2011, and English translation thereof.

(Continued)

*Primary Examiner* — Larry Donaghue (57) ABSTRACT

A method and system for providing a message including a URL. The method includes: detecting whether a first URL is included in message content within a message input by a user; if the first URL is included in the message content, calculating the length of the message by taking a first length value as the length of the first URL; if the calculated message length is less than the predetermined message length, allowing the user to keep on adding message content to the message; replacing the first URL included in the message by a second URL, and saving corresponding relationship between the first URL and the second URL. The length of the second URL is less than or equal to the first length value; providing the message including the second URL.

29 Claims, 3 Drawing Sheets

(56) References Cited

U.S. PATENT DOCUMENTS

2011/0244882 A1* 10/2011 Hancock .................. 455/456.1
2012/0124025 A1* 5/2012 Saglam et al. ............. 707/707
2012/0202525 A1* 8/2012 Pettini ..................... 455/456.3
2013/0238435 A1* 9/2013 Barak et al. .............. 705/14.53

OTHER PUBLICATIONS

Chinese First Office Action for CN 201010287224.7, dated Oct. 15, 2012 (in Chinese).

English translation of the Written Opinion for PCT/CN2011/079629, mailed Nov. 24, 2011; ISA/CN.

* cited by examiner

METHOD AND SYSTEM FOR PROVIDING MESSAGE INCLUDING UNIVERSAL RESOURCE LOCATOR

CROSS-REFERENCE TO RELATED APPLICATIONS

This application is a continuation of International Application No. PCT/CN2011/079629, filed on Sep. 14, 2011. This application claims the benefit and priority of Chinese Patent Application No. 201010287224.7, filed Sep. 16, 2012. The entire disclosures of each of the above applications are incorporated herein by reference.

FIELD

The present disclosure relates to Internet technique, and to a system and method for providing a message using a short Uniform Resource Locator.

BACKGROUND

This section provides background information related to the present disclosure which is not necessarily prior art.

A Uniform Resource Locator (URL) is also known as a web page address, and is an identification method used for completely describing addresses of web pages and other resources in Internet.

There are no requirements on a length of a URL in Internet communication protocol RFC 2616 "Hypertext Transfer Protocol—HTTP/1.1". In fact, limitation of the URL length is determined by two aspects: requirements of a client browser and settings of a server side. For example, a Microsoft Internet Explorer limits the URL length within 2083 bytes, but a maximum length which can be used actually is 2048 bytes.

At present, in the Internet, many services and applications used for providing message presentation have limited message lengths. For example, micro-blog, as a passive message broadcast mechanism, generally limits the length of each message (i.e., a micro-blog article) to 140 characters, Instant Messaging (IM) system generally limits a length of a state signature of each IM user to 50 characters or so, and broadcast messages of some systems also have requirements on lengths of message content as limitations of message window sizes. These messages which have limitations on the length often need to include a URL. For example, a user may introduce an online article which he/she saw recently within his/her signature or a micro-blog article, then the user needs to add a web page address (later referred as URL) of this online article to his/her signature or the micro-blog article. Because there are no limitations on the URL length, the lengths of most generally used URLs are between 37 characters and 87 characters. When a longer URL is inserted into a message which has limited length, it will take up the limited message length space, so that the remaining space used for a user to input text becomes inadequate, and the message length may exceed the limitation.

SUMMARY

This section provides a general summary of the disclosure, and is not a comprehensive disclosure of its full scope or all of its features.

In view of the above, various embodiments provide methods for providing a message including a URL, which make a desired URL be included in a message that has limited length, and make the desired URL take up as short length as possible in the message simultaneously.

Various embodiments also provide systems for providing a message including a URL, which make a desired URL be included in a message that has limited length, and make the desired URL take up as short length as possible in the message simultaneously.

Various embodiments provide a method for providing a message including a Uniform Resource Locator (URL) including:
  detecting whether a first URL is included in message content within a message input by a user;
  if the first URL is included in the message content, calculating the length of the message by taking a first length value as the length of the first URL;
  if the calculated length of the message is less than the predetermined message length, allowing the user to keep on adding message content to the message;
  replacing the first URL included in the message by a second URL, and saving corresponding relationship between the first URL and the second URL; wherein the length of the second URL is less than or equal to the first length value;
  providing the message including the second URL.

Various embodiments provide a method for providing a message including a Uniform Resource Locator (URL) including:
  replacing a first URL included in a message by a second URL, and saving corresponding relationship between the first URL and the second URL; wherein the length of the second URL is less than the length of the first URL;
  providing the message including the second URL; and
  receiving a request sent by a requester including the second URL, and returning the first URL to the requester according to the saved corresponding relationship between the first URL and the second URL.

Various embodiments provide a system for providing a message including a Uniform Resource Locator (URL) including:
  a service processing module, to detect whether a first URL is included in message content within a message input by a user; if the first URL is included in the message content, calculate the length of the message by taking a first length value as the length of the first URL; if the calculated length of the message is less than the predetermined message length, allow the user to keep on adding message content to the message; when receiving a request sent by the user for submitting the message, obtain a second URL corresponding to the first URL from the query module; replace the first URL included in the message by the second URL; provide the message including the second URL; wherein the length of the second URL is less than or equal to the first length value;
  the query module, to generate the second URL according to the first URL, and save corresponding relationship between the first URL and the second URL.

Various embodiments provide a system for providing a message including a Uniform Resource Locator (URL) including:
  a service processing module, to obtain a second URL corresponding to a first URL included in a message from a query module; replace the first URL included in the message by the second URL; provide the message including the second URL; wherein the length of the second URL is less than the length of the first URL; and
  the query module, to generate the second URL according to the first URL; save corresponding relationship between the first URL and the second URL; receive a request including the second URL sent by a requester, and return the first URL to the requester according to the saved corresponding relationship between the first URL and the second URL.

It can be seen from the above that a method and system of the various embodiments for providing a message including a URL, convert the URL in a message into a shorter URL, so that the URL takes up as short length as possible in the message body, and that the message length will not be too long when a long URL is inserted into the message by a user or system according to needs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Various embodiments are hereinafter described in detail with reference to accompanying drawings and examples, so as to make technical solution and merits of the various embodiments more apparent.

In various embodiments, a first URL in a message is replaced by a shorter second URL, and corresponding relationship between the first URL and the second URL is saved. When the second URL is requested, the first URL is obtained according to the corresponding relationship and is returned to a requester.

Various embodiments may have multiple implementations, because of limited space, the various embodiments are hereinafter described in detail with reference to several typical examples listed as follows. One skilled in the art may transform these examples according to actual needs, and the technical solution obtained by the transformation is still within the scope of protection.

Figure 1:
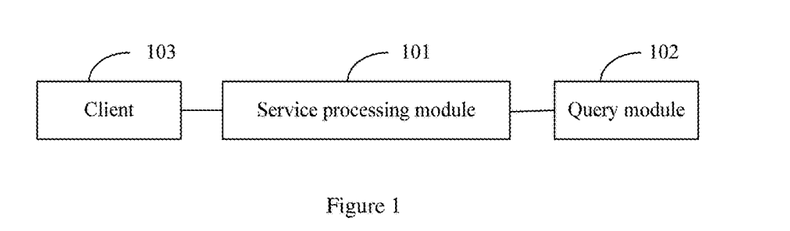
FIG. 1 is a schematic diagram illustrating structure of a system for providing a message including a URL according to various embodiments.

FIG. 1 is a schematic diagram illustrating structure of a system for providing a message including a URL according to various embodiments. The system mainly includes: a service processing module 101, a query module 102 and a client 103. The service processing module 101 is mainly used for performing service logics, providing information for the client 103, dealing with various requests sent by the client 103, and getting URL information from the query module 102. The query module 102 is mainly used for converting, storing and querying a URL. The above modules are obtained by logical division based on functions of the system. In actual implementation, each module may be achieved by the same physical device, or may be distributed in more than one physical entity.

Figure 2:
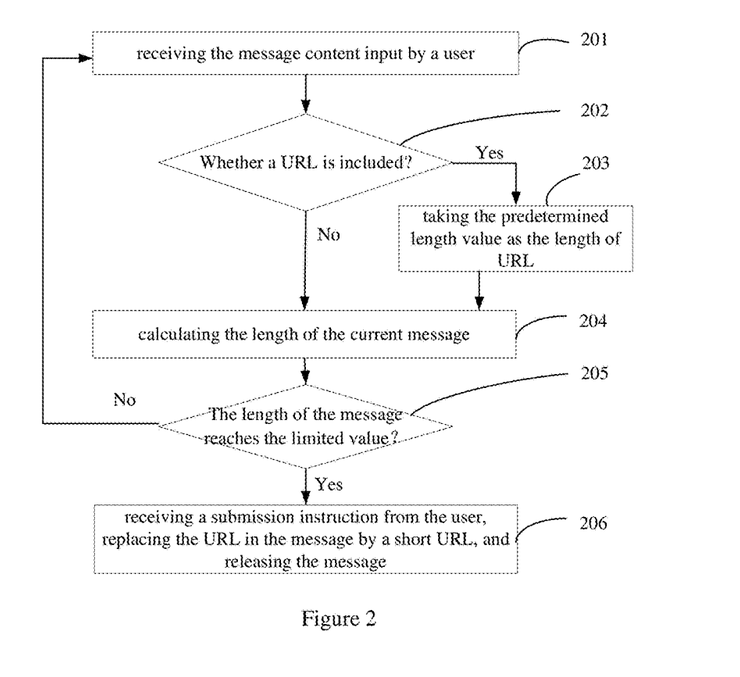
FIG. 2 is a flowchart illustrating a method for providing a message including a URL according to various embodiments.

FIG. 2 is a flowchart illustrating a method for providing a message including a URL according to various embodiments. Various embodiments are applicable to situations in which a short URL is used in a message that has limited length, such as application scenarios such as the micro-blog and the user signature. Various embodiments are used for illustrative purposes only, and one skilled in the art may adjust execution order of these processes according to actual needs, modify or omit certain processes, or add some processes aiming at specific situations. The words "first" and "second" in following description are only used for distinguishing between two objects which have the same name, and they do not have practical significance.

The method of this embodiment for providing a message including a URL mainly includes the following.

At 201, message content input by a user for the message is received.

At 202, it is detected whether a first URL is included in the message content. If the first URL is included in the message content, then 203 is performed, otherwise 204 is performed.

At 203, a first length value is taken as a length of the first URL. Here, the first length value may be predetermined, or may also be calculated in real time according to the first URL.

At 204, a current length of the message is calculated.

At 205, it is determined whether the calculated message length meets a predetermined message length. If the calculated message length is smaller than the predetermined message length, then it is returned to 201, so that the user may continue to add message content into the message. If the calculated message length reaches the predetermined message length, then 206 is performed. The predetermined message length is a limited value set by the system for a maximum message length.

At 206, a submission instruction from the user is received, the first URL included in the message is replaced by a second URL, and corresponding relationship between the first URL and the second URL is saved, and the message including the second URL is provided. Here, a length of the second URL is smaller than or equal to the first length value.

Therefore, when a request including the second URL sent by a requester is received, the first URL is returned to the requester according to the saved corresponding relationship between the first URL and the second URL.

The above may be executed by the service processing module 101 shown in FIG. 1. Here, in 206, the service processing module 101 needs to obtain the second URL corresponding to the first URL from the query module 102, while the query module 102 needs to save the corresponding relationship between the first URL and the second URL.

At 206, that the message including the second URL is provided may be that: the message is released to users in the system, or the message is saved and provided to users who request the message. In this way, the client of the user in the system may display the message for the user.

When other users browse this message through the client, they may be interested in the second URL in the message. Thus, the system also needs to correctly find the corresponding first URL from the second URL, and allow the user to query and access the first URL through the second URL. The processes of the system providing query function and access function are described respectively as follows.

When a second user (he/she may be any user) moves a mouse to the second URL displayed in a client, the client will send a query request including the second URL for querying the second URL. When receiving the query request, the service processing module 101 obtains the first URL corresponding to the second URL from the query module 102, and provides the first URL to the client for displaying. The first URL is displayed in a floating window by the client, or may be displayed in other forms. The specific display methods are not limited by various embodiments.

When the second user clicks the second URL displayed in the client, or directly inputs the second URL into the client to request to access a web page which is pointed to by the second URL, the client will send an access request including the second URL to a network device which is pointed to by the second URL. According to various embodiments, this network device may be a web server in the system.

When receiving the access request, the web server will send a query request including the second URL to the query module 102. The query module 102 obtains the first URL according to the saved corresponding relationship between the first URL and the second URL, and provides the first URL to the web server. After obtaining the first URL from the query module 102, the web server makes the client of the second user jump or redirect to a web page which is pointed to by the first URL. The methods of jumping or redirecting belong to the prior art, and are not repeated here.

In this way, the functions of querying and accessing the first URL through the second URL are achieved by the system.

According to various embodiments, a fixed format may be set for the second URL, including a host name and a suffix. Here, the host name may point to a device in the system, such as the above web server, i.e., a domain name of this device is set as the host name. Different second URLs are distinguished between each other by their suffixes.

The above second URL may be configured according to specific service requirements, or be obtained by selecting an appropriate algorithm to process the first URL. The following is cited to illustrate a method for generating the second URL. One skilled in the art would be able to make improvements or simplifications based on this example to adapt to the actual needs.

In various embodiments, the query module 102 may assign a unique serial number for the first URL, codes the serial number to generate the suffix, and generates the second URL according to the host name and the suffix finally.

The query module 102 may save the corresponding relationship between the first URL and the second URL, or may only save corresponding relationship between the first URL and the suffix of the second URL.

The suffix may include any numbers, uppercase letters, lowercase letters and symbols. A length of the suffix may be fixed or variable. For example, it may set a length range, such as 1 to 10 symbols. The length of the suffix mainly depends on a form of the serial number and a method used for coding.

When a fixed-length suffix is used, in 203, the first length value may be a predetermined length of the second URL, which may be obtained by calculating the host name, i.e., the domain name of the above web server, and the fixed length of the suffix. When a variable-length suffix is used, in 203, it is needed to obtain the suffix of the second URL by calculating the first URL, then the length of the second URL is obtained by calculating the suffix and then is taken as the first length value; or, a maximum length of the suffix is taken as the suffix length of the second URL, and the length of the second URL is obtained by calculating this suffix length and then is taken as the first length value.

According to various embodiments, the fixed-length suffix is used to simplify the processing of the system and improve efficiency. Data of long integer type may be used as the serial numbers, such as 32-bit or 64-bit data of long integer type, and these serial numbers are assigned in turn to the first URLs in the received messages. Then, the serial number of the first URL is coded to obtain the suffix through a certain algorithm, such as the Hush algorithm or the MD5 algorithm.

The above is just one method for generating the suffix of the second URL, and other methods may also be used, such as the first URL is coded directly. The coding algorithms are not limited to the above two algorithms. Other algorithms which may make a long sequence become short and make the coded suffix have little repeatability may also be used.

In many cases, some web pages that include popular content will be referenced by a large number of users in their blogs and signatures in a period of time, and therefore, may be improved as follows. When receiving a URL converting request including the first URL, the query module 102 may first determine whether the first URL has been saved or not. If the first URL has been saved already, then the query module 102 may obtain the second URL according to the corresponding relationship between the first URL and the second URL without having to save multiple different second URLs for the same first URL. Therefore, the system resource is saved, efficiency is improved, and it is convenient for the system to provide other services.

For example, according to various embodiments, the system may also record at least one of the following information:

the number that the second URL is requested, it may be the number that the second URL is queried, or the number that the second URL is clicked, etc.;

the time that the second URL is requested last time, it may be the time that the second URL is queried last time, or the time that the second URL is accessed last time, etc.;

the number of messages including the first URL within the received messages, i.e., the number that the first URL is cited by different messages; or the input time of the latest message within the received messages including the first URL, i.e., the time that the first URL is cited last.

When a query request including the second URL is sent by the client, the system may provide the above recorded information together with the queried first URL to the client. The client may use any means to provide the above information to the user, for example, the above information is displayed simultaneously at the same place where the first URL is displayed.

According to the above recorded information, the system may also clean and update the saved corresponding relationship between the first URL and the second URL. For example, whether the second URL and/or the first URL is old or not is determined according to the above recorded time information and/or number information. If the second URL and/or the first URL is determined as old, then the saved corresponding relationship between the first URL and the second URL is deleted. At this time, the serial number of the deleted first URL is free, and may be assigned to other URLs in future.

When it is possible to assign the serial number to different URLs, in order to ensure that a request whose target is the original first URL will not be mistakenly pointed to a new first URL, the generated suffix must not be identical. This may be achieved through using some special coding or algorithms. For example, it may use an out-of-order algorithm to process the serial number, and then the processed serial number is coded.

According to various embodiments, in order to realize control domain management based on security, when a client sends a query request including a second URL, the system may query security information of the first URL from a security center and then provide this security information to the client, then the security information is displayed to the user by the client. The security information may be displayed as a text, or also be displayed as an icon. The security information may prompt that the first URL is a secure link, a risk link or a dangerous link. For the secure link, the system may automatically jump after the user clicks the second URL. For the risk link, the system may prompt the user to jump manually or jump automatically after changing the configuration. For the dangerous link, the system may prompt the user to have to jump manually. Security domain control function belongs to the prior art, and its specific implementation will not be repeated here.

Figure 3:
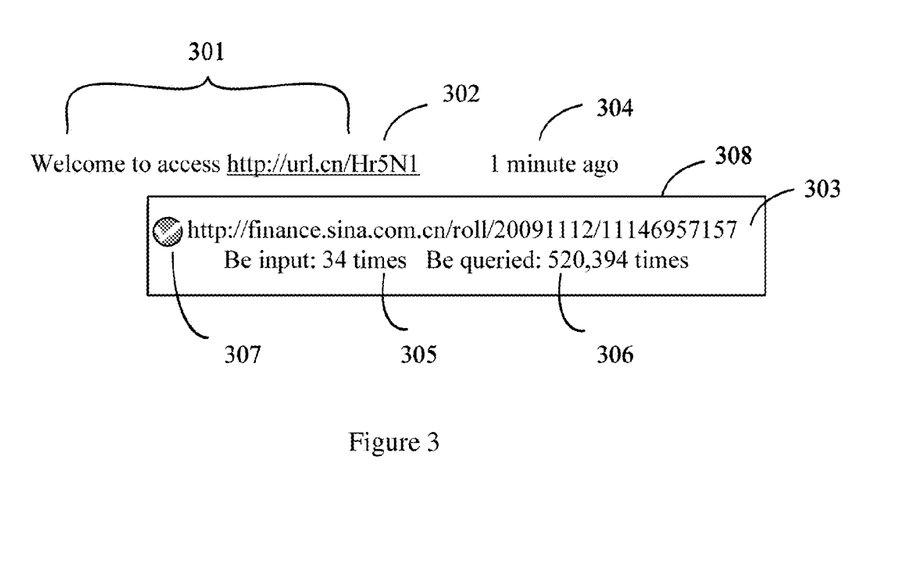
FIG. 3 is a schematic diagram illustrating display effect of a client according to various embodiments.

FIG. 3 is a schematic diagram illustrating display effect of a client according to various embodiments. In FIG. 3, 301 is a message body, 302 is a second URL, 304 is release time of the message, and 308 is a floating window displayed when a user moves a mouse to a part shown by 302. Here, 303 is a first URL, 305 is the number that the first URL is cited by different messages, 306 is the number that the second URL is queried, and 307 is an icon for reflecting the security information of the first URL. Here, in the URL shown by 302, "url.cn" is a host name of a web server, and "Hr5N1" is a suffix.

In addition, it is taken into account that some cited URLs are not very long, so that various embodiments may be optimized. For example, in 203 or 206, it may first determine whether the length of the first URL is greater than the first length value. If the length of the first URL is less than or equal to the first length value or another predetermined threshold value, replacing operation of the URL will not be performed. In this way, the system may realize that only a URL whose length is greater than a certain value or a URL whose length is shortened greatly after being converted is replaced, so that the system resource is saved, and system efficiency is improved.

Figure 4:
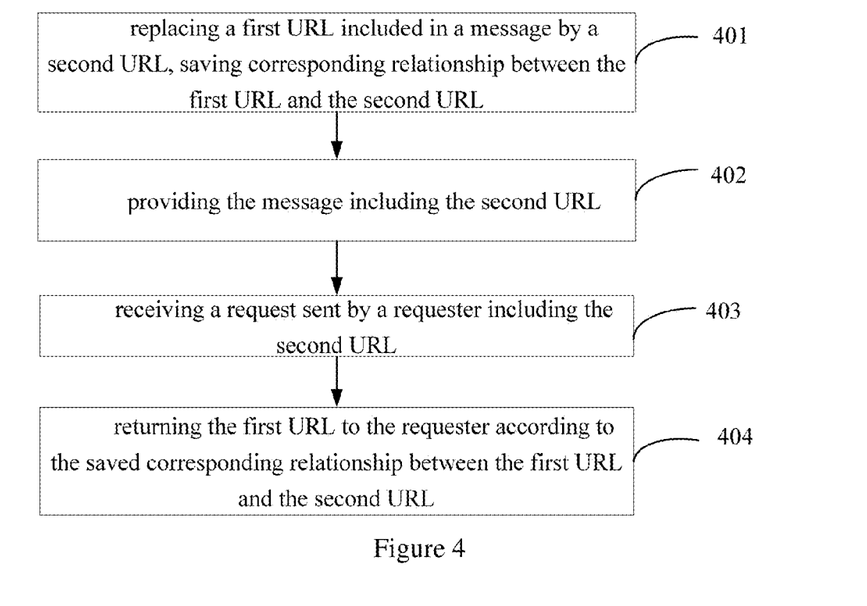
FIG. 4 is a flowchart illustrating a method for providing a message including a URL according to various embodiments.

FIG. 4 is a flowchart illustrating a method for providing a message including a URL according to various embodiments. Various embodiments are applicable to application scenarios such as micro-blog and user signature, and to the application scenarios that the system releases limited-length broadcast messages or multicast messages.

The method for providing a message including a URL mainly includes the following.

At 401, a first URL included in the message is replaced by a second URL, and corresponding relationship between the first URL and the second URL is saved. Here, the message may be a message input by a user, or a message to be released which is generated by the system. A length of the second URL is less than a length of the first URL.

At 402, the message including the second URL is provided.

At 403, a request including the second URL sent by a requester is received. The requester may be a client, or a web server.

At 404, the first URL is returned to the requester according to the saved corresponding relationship between the first URL and the second URL.

In the first embodiment, the first URL included in the message is replaced by the second URL when a message is being submitted after the message has been edited by the user. In the second embodiment, the first URL included in the message is replaced by the second URL after the first URL is input. When the message length is limited, the message length may be directly calculated in accordance with the replaced message content, so that it does not need to calculate the message length through replacing the length of the first URL by a predetermined length value which is shown in the first embodiment. It does not need to change a message length monitoring function of the system. Therefore, the second embodiment is simpler than the first embodiment.

Other system functions and processes of the second embodiment are similar with those of the first embodiment, such as querying and accessing the second URL, structure and generation method of the second URL, determining whether the first URL has been saved or not before replacing, determining whether it is needed to replace the first URL, as well as updating and maintaining the corresponding relationship between the first URL and the second URL.

The system provided by various embodiments may use the structure shown in FIG. 1.

A service processing module 101, which is adapted to obtain a second URL corresponding to a first URL included in a message from a query module 102; replaces the first URL included in the message by the second URL; and provides the message including the second URL. A length of the second URL is less than that of the first URL.

A query module 102, which is adapted to generate the second URL according to the first URL, save corresponding relationship between the first URL and the second URL; receive a request including the second URL sent by a requester, and return the first URL to the requester according to the saved corresponding relationship between the first URL and the second URL.

According to various embodiments, the query module 102 may first determine whether the first URL has been saved or not. If the first URL has been saved already, then the query module 102 may obtain the second URL according to the corresponding relationship between the first URL and the second URL.

According to various embodiments, the query module 102 may also receive a query request including the second URL sent by a client 103, and return the first URL to the client 103 according to the corresponding relationship between the first URL and the second URL.

When the second URL is generated according to the first URL, the query module 102 assigns a unique serial number for the first URL, codes the serial number to generate a suffix, and then generates the second URL, which points to a web server, by using a host name of the web server and the suffix.

The system may further include a web server, which is adapted to send a query request to the query module 102 when receiving an access request, sent by a client of a second user, for accessing a web page pointed to by the second URL, and obtain the first URL corresponding to the second URL from the query module 102, so that the client of the second user may jump or redirect to a web page pointed to by the first URL.

Figure 5:
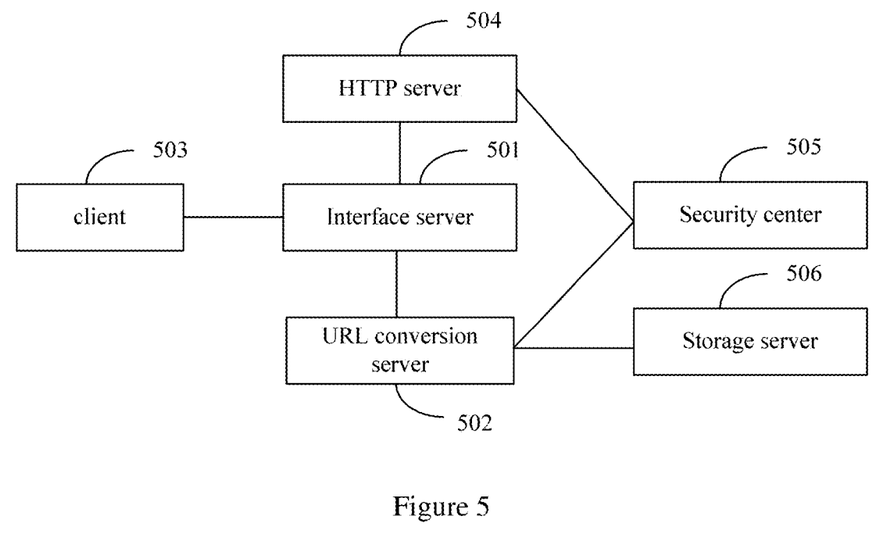
FIG. 5 is a schematic diagram illustrating structure of a system for providing a message including a URL according to various embodiments.

FIG. 5 is a schematic diagram illustrating structure of a system for providing a message including a URL according to various embodiments. The system may include the following devices.

An interface server 501, which is adapted to receive message content and a request, input by a user, sent by a client 503; the request may be a message submission request, a URL query request, and a URL access request, etc.; provide the message content and the URL query request to a URL conversion server 502; provide the URL access request to a HTTP server 504; forward information between the client 503 and the URL conversion server 502, between the client 503 and the HTTP server 504, as well as forward information between the URL conversion server 502 and the HTTP server 504.

The URL conversion server 502, which is adapted to replace the first URL included in the message that is sent by the client 503 with the second URL. It may be queried first to determine whether the first URL has been saved in a storage server 506. If the first URL has already existed, then the URL conversion server 502 obtains the second URL corresponding to the first URL from the storage server 506. If the first URL has not already existed, then the URL conversion server 502 generates the second URL according to the first URL, and saves the corresponding relationship between the first URL and the second URL in the storage server 506. Functions of the URL conversion server 502 are similar to those of the query module 102 shown in FIG. 1 except that the storage function of the query module 102 is achieved through the storage server 506.

The HTTP server 504, which is adapted to receive an access quest including the second URL sent by the client 503 via the interface server 501, obtain the first URL corresponding to the second URL from the URL conversion server 502 via the interface server 501 to make the client 503 jump or redirect to the first URL.

The storage server 506, which is adapted to save the corresponding relationship between the first URL and the second URL. According to various embodiments, the storage server 506 may be further adapted to record related information of the first URL and the second URL, for example, the number that the second URL is requested, the time that the second URL is requested last time, the number of messages including the first URL within the received messages, and the input time of the latest message within the received messages including the first URL, etc.

A security center 505, which is adapted to receive a request for querying security information of the first URL sent by the URL conversion server 502 and the HTTP server 504, and provide the security information of the first URL to the URL conversion server 502 and the HTTP server 504.

The client 503, which is adapted to receive message content and a message submission request input by the user, and send the message content and the message submission request to the interface server 501; send a URL query request and a URL access request to the interface server 501; receive and display the first URL, the related information of the first URL and the second URL, as well as the security information of the first URL, which are sent by the interface server 501.

The clients 103 and 503 may be a browser, an IM client, or a micro-blog client, etc.

The technical solution provided by various embodiments, converts the URL in a message into a shorter URL, so that the URL takes up as short length as possible in the message body, and that the message length will not be too long when a long URL is inserted into the message by a user or system according to needs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for providing a message including a Uniform Resource Locator (URL), comprising:
   detecting whether a first URL is included in a message input by a user;
   if the first URL is included in the message, calculating a length of the message by taking a first length value as a length of the first URL;
   if a calculated length of the message is less than a predetermined message length, allowing the user to keep on adding message content to the message;
   replacing the first URL included in the message with a second URL, and saving corresponding relationship between the first URL and the second URL;
   wherein a length of the second URL is less than or equal to the first length value; and
   providing the message including the second URL.

2. The method of claim 1, further comprising:
   receiving a request including the second URL which is sent by a requester, and returning the first URL to the requester according to the corresponding relationship between the first URL and the second URL.

3. The method of claim 2, wherein the request is a query request sent by a client when a second user moves a mouse to the second URL displayed in the client, and the requester is the client, the method further comprises:
   the client displaying the first URL.

4. The method of claim 3, further comprising:
   querying security information of the first URL, and providing the security information to the client; and
   the client displaying the security information.

5. The method of claim 2, wherein the second URL points to a web server, the request is a query request sent by the web server when the web server receives an access request sent by a client of a second user for accessing a web page pointed to by the second URL, and the requester is the web server, the method further comprises:
   the web server making the client of the second user jump or redirect to a web page pointed to by the first URL.

6. The method of claim 1, further comprising:
   determining whether the length of the first URL is greater than the first length value;
   wherein the replacing the first URL included in the message with the second URL, and saving the corresponding relationship between the first URL and the second URL comprises:
   if the length of the first URL is greater than the first length value, replacing the first URL included in the message content with the second URL, and saving the corresponding relationship between the first URL and the second URL.

7. The method of claim 1, wherein the second URL comprises a host name and a suffix; wherein the corresponding relationship between the first URL and the second URL is corresponding relationship between the first URL and the suffix.

8. The method of claim 7, further comprising:
assigning a unique serial number for the first URL;
coding the serial number to generate the suffix; and
generating the second URL according to the host name and the suffix.

9. The method of claim 1, further comprising:
determining whether the first URL has been saved or not; and
if the first URL has been saved already, obtaining the second URL according to the saved corresponding relationship between the first URL and the second URL.

10. The method of claim 1, further comprising:
recording at least one of the following information: the number that the second URL is requested, the time that the second URL is requested last time, the number of messages including the first URL within the received messages, and the input time of the latest message within the received messages including the first URL.

11. The method of claim 3, further comprising:
recording at least one of the following information: the number that the second URL is requested, the time that the second URL is requested last time, the number of messages including the first URL within the received messages, and input time of the latest message within the received messages including the first URL; and
the client displaying recorded information related to the queried second URL and the first URL corresponding to the second URL.

12. The method of claim 10, further comprising:
determining whether the second URL and/or the first URL is old according to the recorded information; if it is old, deleting the saved corresponding relationship between the first URL and the second URL.

13. The method of claim 8, further comprising:
determining whether the second URL and/or the first URL is old according to the recorded information; if it is old, deleting the saved corresponding relationship between the first URL and the second URL, and assigning the serial number of the first URL to a third URL;
wherein the coding the serial number to generate the suffix comprises:
processing the serial number with an out-of-order algorithm, and coding the processed serial number.

14. The method of claim 8, wherein,
a data type of the serial number is a long integer type; and
the coding the serial number comprises: coding the serial number using a Hash algorithm or a MD5 algorithm.

15. A method for providing a message including a Uniform Resource Locator (URL), comprising:
replacing a first URL included in a message with a second URL, and saving a corresponding relationship between the first URL and the second URL; wherein a length of the second URL is less than a length of the first URL;
providing the message including the second URL; and
receiving a request including the second URL which is sent by a requester, and returning the first URL to the requester according to the saved corresponding relationship between the first URL and the second URL;
wherein the request is a query request sent by a client when a second user moves a mouse to the second URL displayed in the client, and the requester is the client, the method further comprises:
the client displaying the first URL.

16. A method for providing a message including a Uniform Resource Locator (URL), comprising:
replacing a first URL including in a message with a second URL, and saving a corresponding relationship between the first URL and the second URL; wherein a length of the second URL is less than a length of the first URL;
providing the message including the second URL; and
receiving a request including the second URL which is sent by a requester, and returning the first URL to the requester according to the saved corresponding relationship between the first URL and the second URL;
wherein the second URL comprises a host name and a suffix; wherein the corresponding relationship between the first URL and the second URL is corresponding relationship between the first URL and the suffix.

17. The method of claim 16, wherein the host name points to a web server, the request is a query request sent by the web server when the web server receives an access request sent by a client of a second user for accessing a web page pointed to by the second URL, and the requester is the web server, the method further comprises:
the web server making the client of the second user jump or redirect to a web page pointed to by the first URL.

18. The method of claim 16, further comprising:
assigning a unique serial number for the first URL;
coding the serial number to generate the suffix; and
generating the second URL according to the host name and the suffix.

19. The method of claim 16, further comprising:
determining whether the first URL has been saved or not; and
if the first URL has been saved already, obtaining the second URL according to the saved corresponding relationship between the first URL and the second URL.

20. The method of claim 16, further comprising:
determining whether the length of the first URL is greater than a first length value;
wherein the replacing the first URL included in the message with the second URL, and saving the corresponding relationship between the first URL and the second URL comprises:
if the length of the first URL is greater than the first length value, replacing the first URL included in the message with the second URL, and saving the corresponding relationship between the first URL and the second URL.

21. A system for providing a message including a Uniform Resource Locator (URL), comprising a service processing module and a query module, wherein,
the service processing module is to detect whether a first URL is included in a message input by a user; if the first URL is included in the message, calculate a length of the message by taking a first length value as a length of the first URL; if the calculated length of the message is less than a predetermined message length, allow the user to keep on adding message content to the message; when receiving a request sent by the user for submitting the message, obtain a second URL corresponding to the first URL from the query module; replace the first URL included in the message with the second URL; provide the message including the second URL; wherein a length of the second URL is less than or equal to the first length value; and
the query module is to generate the second URL according to the first URL, and save a corresponding relationship between the first URL and the second URL.

22. The system of claim 21, wherein the query module is further to determine whether the first URL has been saved in the query module; if the query module has saved the first URL already, obtain the second URL according to the saved corresponding relationship between the first URL and the second URL.

23. The system of claim 21, wherein the service processing module is further to receive a query request including the second URL which is sent by a client, obtain the first URL corresponding to the second URL from the query module, and return the first URL to the client.

24. The system of claim 21, wherein the query module is to assign a unique serial number for the first URL; code the serial number to generate a suffix; generate the second URL pointing to a web server through using a host name of the web server and the suffix.

25. A system for providing a message including a Uniform Resource Locator (URL), comprising:
  a service processing module, to obtain from a query module a second URL corresponding to a first URL included in a message; replace the first URL included in the message with the second URL; provide the message including the second URL; wherein a length of the second URL is less than a length of the first URL; and
  the query module, to generate the second URL according to the first URL; save a corresponding relationship between the first URL and the second URL; receive a request including the second URL which is sent by a requester, and return the first URL to the requester according to the saved corresponding relationship between the first URL and the second URL;
  wherein the query module is further to determine whether the first URL has been saved or not; if the first URL has been saved already, obtain the second URL according to the saved corresponding relationship between the first URL and the second URL.

26. A system for providing a message including a Uniform Resource Locator (URL), comprising:
  a service processing module, to obtain from a query module a second URL corresponding to a first URL included in a message; replace the first URL included in the message with the second URL; provide the message including the second URL; wherein a length of the second URL is less than a length of the first URL; and
  the query module, to generate the second URL according to the first URL; save a corresponding relationship between the first URL and the second URL; receive a request including the second URL which is sent by a requester, and return the first URL to the requester according to the saved corresponding relationship between the first URL and the second URL;
  wherein the query module is further to receive a query request including the second URL which is sent by a client, and return the first URL to the client according to the corresponding relationship between the first URL and the second URL.

27. A system for providing a message including a Uniform Resource Locator (URL), comprising:
  a service processing module, to obtain from a query module a second URL corresponding to a first URL included in a message; replace the first URL included in the message with the second URL; provide the message including the second URL; wherein a length of the second URL is less than a length of the first URL; and
  the query module, to generate the second URL according to the first URL; save a corresponding relationship between the first URL and the second URL; receive a request including the second URL which is sent by a requester, and return the first URL to the requester according to the saved corresponding relationship between the first URL and the second URL;
  wherein the query module is to assign a unique serial number for the first URL; code the serial number to generate a suffix; generate the second URL pointing to a web server through using a host name of the web server and the suffix.

28. The system of claim 24, wherein the web server is to obtain the first URL corresponding to the second URL from the query module when receiving an access request sent by a client of a second user for accessing a web page pointed to by the second URL, make the client of the second user jump or redirect to a web page pointed to by the first URL.

29. The system of claim 27, wherein the web server is to send a query request to the query module when receiving an access request sent by a client of a user for accessing a web page pointed to by the second URL, obtain from the query module the first URL corresponding to the second URL; and make the client of the user jump or redirect to a web page pointed to by the first URL.

\* \* \* \* \*